United States Patent
Steele et al.

(10) Patent No.: US 9,743,682 B1
(45) Date of Patent: Aug. 29, 2017

(54) PAINTABLE GELATIN SUBSTRATES

(76) Inventors: Evelyn Rowland Steele, Westport, KY (US); Lida Rowland Snow, La Grange, KY (US)

(*) Notice: Subject to any disclaimer, the term of this patent is extended or adjusted under 35 U.S.C. 154(b) by 0 days.

(21) Appl. No.: 13/507,552

(22) Filed: Jul. 9, 2012

Related U.S. Application Data

(63) Continuation-in-part of application No. 12/384,040, filed on Mar. 31, 2009, now abandoned.

(51) Int. Cl.
| | |
|---|---|
| *A23L 1/27* | (2006.01) |
| *A23G 3/44* | (2006.01) |
| *A23G 3/46* | (2006.01) |
| *A23G 3/20* | (2006.01) |
| *A23G 3/28* | (2006.01) |
| *A23G 9/28* | (2006.01) |

(52) U.S. Cl.
CPC ............... *A23G 3/44* (2013.01); *A23G 3/46* (2013.01); *A23G 3/2023* (2013.01); *A23G 3/28* (2013.01); *A23G 9/285* (2013.01); *A23G 2200/12* (2013.01); *A23G 2220/20* (2013.01)

(58) Field of Classification Search
CPC ..... A23L 1/1875; A23L 1/005; A23G 3/2023; A23G 9/48; A23G 9/282; A23G 9/285; A23G 3/28; A23G 2200/12; A23G 2220/20
USPC .................................. 426/89, 249, 250, 383
See application file for complete search history.

(56) References Cited

U.S. PATENT DOCUMENTS

| | | | |
|---|---|---|---|
| 3,052,552 A | * | 9/1962 | Koerner et al. ................. 426/3 |
| 3,199,988 A | | 8/1965 | Kozlik |
| 3,537,406 A | | 11/1970 | Ort |
| 3,579,355 A | | 5/1971 | Wyss et al. |
| 4,112,125 A | | 9/1978 | Chesnut et al. |
| 4,285,978 A | | 8/1981 | Quinlivan |
| 4,560,562 A | | 12/1985 | Schroeder |
| 4,717,571 A | | 1/1988 | Okonogi et al. |
| 5,417,990 A | * | 5/1995 | Soedjak et al. ................. 426/89 |
| 6,299,374 B1 | | 10/2001 | Naor et al. |
| 6,743,455 B2 | * | 6/2004 | Hashisaka et al. ........... 426/249 |
| 6,887,504 B2 | | 5/2005 | Palmer et al. |

(Continued)

OTHER PUBLICATIONS www. recipelink.com/msgbrd/board_2/tklcc, html, Cranberry cream cheese mold, Nov. 21, 2001, 4 pages.*

(Continued)

*Primary Examiner* — Jyoti Chawla
(74) *Attorney, Agent, or Firm* — Carrithers Law Office, PLLC

(57) ABSTRACT

A gelatin based substrate containing a milk based product and gelatin substrate mixture is chilled forming a first gelatin and milk based substrate layer which is paintable with oil and natural vegetable gum based edible paint or colorant. Additional layers can be prepared comprising a selected gelatin or gelatin containing flavored ingredients such as fruit or berries or combinations thereof forming a bi-layer or multi-layer low calorie dessert product. The multi-layered product is inverted leaving the first gel and milk based substrate as the top layer of the finished dessert product which may be painted with oil based edible coloring agent including an edible paint, edible dye, edible soluble ink, and combinations thereof. The gelatin and milk based substrate can also be used to prevent bleeding or migration of colors between different colored gelatin layers.

17 Claims, 3 Drawing Sheets

(56) References Cited

U.S. PATENT DOCUMENTS

| | | |
|---|---|---|
| 2003/0003204 A1 | 1/2003 | Cooper |
| 2003/0099746 A1 | 5/2003 | Palmer et al. |
| 2006/0013928 A1 | 1/2006 | Steet et al. |
| 2006/0251775 A1 | 11/2006 | Anderson et al. |

OTHER PUBLICATIONS

Old Betty Crocker sugar cookie recipe by, Elly obtained from http://www.recipelink.com/msgbrd/board_2/tklcc.htm112/14/1999, 3 pages.* http: //forum.lowcarber.org/archive/index.php/t-198912.html about Atkins diet support and sugar free jell-O, Jul. 2004, pp. 3.*

* cited by examiner

PAINTABLE GELATIN SUBSTRATES

CROSS REFERENCE TO RELATED APPLICATIONS

This application is a Continuation-In-Part of U.S. application Ser. No. 12/384,040 filed on Mar. 31, 2009 which is incorporated by reference in its entirety.

FIELD OF INVENTION

A water soluble milk based product forming a gelatin paintable substrate is comprised of a mixture of a gelatin and milk based ingredient(s) whereby after cooling and setting, the substrate surface can be decorated with designs, drawings, and paintings, using coloring agents such as oil based edible dyes, inks, and paints containing a vegetable gum or gum derivative effectively minimizing and/or eliminating bleeding, diffusion, and/or migration of the colors from the paint into the surrounding gel substrate. The paintable substrate layer which includes a gelatin component can be used to cover gelatin, fruit, or other layers of edible foodstuffs or used to prevent bleeding or migration of colors into a multi-layer gel food product.

BACKGROUND OF THE INVENTION

The present invention relates to the preparation of gelatin based food products, and more particularly to providing a method for forming a gelatin food product having a water soluble substrate on the surface forming a layer or coating which resists bleeding or leeching of colors thereon when painted with oil based edible paints. Dyes, paints, colorants, or inks are all included as means of coloring within the scope of the present invention.

Gels are colloids in which the dispersed phase has combined with the dispersion medium to produce a semisolid material such as a jelly or JELL-O type edible food product. Gel based rood products provide a low calorie healthy snack food or dessert such as are available in single or multiple serving portions. The food products are shelf stable or refrigerated and contain gelatin, agar, furcellaran, carrageenan, low methoxyl pectin, locust bean gum, xanthan gum, or other gelling agents. Conventional layered dessert gels having different ingredients or colors are formed by first forming a bottom gelled layer and then adding an upper layer onto the already gelled bottom layer. Because the colors are typically formed from water soluble ingredients, color migration occurs over time. It is desirable to maintain color stability in Ready to eat gel desserts which are pre-packaged and sold in single servings in retail stores; therefor, color migration can be a problem when marketing multi-colored and multi-layered gel products.

U.S. Pat. No. 5,417,990 by Soedjak et al. which issued in May of 1995 teaches the use of multi layered and multi colored gelled products using water soluble colorants and complexing agents (polyamino acids and protein materials) for colorants to prevent the colorant from migrating within the gelled layer. The crux of the '990 patent is to identify a variety of water soluble compounds such as polyamino acids, polyarginine, polylysine and polyhistidine capable of forming water soluble complexes with commonly used food colorants.

The vast majority of prior art relating to decorating pertains to confections and baked goods and the means or methods for forming three dimensional decorations and designs, usually by application of additional foodstuffs such as icing, flour, or glaze prior to applying water soluble rood coloring, food dyes and the like to obtain the desired design, color and configuration. A problem occurs because these pre-cooked items are typically porous in nature and application of a water soluble paint or colorants thereto results in bleeding of the dye or paint and blurring or the design.

A method of applying edible paint to a food product is taught in U.S. Pat. No. 3,537,406 by Ort which issued in November of 1970 which teaches applying designs to baked goods by silk-screening edible inks onto "half-proof" or partially risen rolls or breads. However, silk-screening permits but one color ink to be applied at a time; therefore, if it is desired to decorate a baked good with a multicolored design, several different silkscreens must be made, and a corresponding number of inking steps must be employed. Due to the amorphous nature of dough, it is difficult to insure proper registration of the several inks so that they are each in the proper places with respect to one another. The Ort reference coats the dough with flour or glycerin prior to transferring the ink to the transfer.

U.S. Pat. No. 4,560,562 by Schroeder issued in December of 1985 teaches a combination of a thin sheet of marshmallow enclosed and sealed in a plastic film wherein the film is frosted to allow creative markings thereon to serve as patterns for making cutouts from the sheet which may be colored by a food coloring dye.

U.S. Pat. No. 4,285,978 by Quinlivan which issued in August of 1981 teaches a decorative design formed upon baked goods by transferring a preprinted design from a transfer material to an uncooked dough surface. The dough surface is coated with a thin layer of flour or a glaze prior to applying a water soluble ink to the surface. One ink composition is water-leachable prior to baking while being water-resistant thereafter.

U.S. Patent Publication 2006/0013928 by Steet et al. published in January of 2006 teaches an aqueous edible paint composition particularly useful for painting on fat-based substrates; U.S. Pat. No. 6,887,504 by Palmer et al. discloses an apparatus for decorating food with an edible substrate using a flexible nib and U.S. Pat. No. 6,299,374 by Naor et al. uses capillary feed to provide a marking instrument both of which are incorporated by reference herein.

U.S. Patent Publication 20060251775 by Anderson et al. published Nov. 6, 2006 discloses solid edible paints which can be diluted with water to produce an edible watercolor based paint and is hereby incorporated by reference.

U.S. Pat. No. 4,717,571 by Okonogi et al. utilizes gelling agents having different gelling set temperatures to form patterns.

Other prior art relates to multilayered gelatin desserts but does not address the decorating aspect. One example of such prior art is U.S. Pat. No. 3,579,355—Wyss, et. al.

Although some manufactures have developed paints and dyes for oil based applications such as for application to sugar based surfaces such as icing, oils, butter based products, and oil based surfaces such as cookies and cakes, none have produced products which allow oil based colors to be applied to water based products such as gelatin or milk based substrates.

SUMMARY OF THE INVENTION

Applicants' water based milk based product and gelatin substrate mixture provides an alternate to the use of the selection of solubles and corresponding complexing agents to provide a low cost method of eliminating the migration of colors by separating the layers of gelatin or providing a top layer of substrate which resists migration and bleeding of even water based color paints and dyes containing at least one natural gum.

One preferred embodiment of the present invention relates to the formation of multi-layered and multi-colored gelatin based food products wherein one or more layers of gelatin based food products include a top surface layer composed of a mixture comprising a gelatin and a milk based product which upon setting forms a substrate which is paintable with either oil based coloring agents without migration of the colors even after an extended period of time.

Multi-component ready to eat gelatin desserts can be produced in accordance with the instant invention by mixing a first gellable liquid and milk based product ingredient forming a gelatin substrate mixture in a container such as a mold, allowing the first layer to gel or set to an extent which supports an adjacent layer; and introducing a second gellable liquid on top of the first gelled layer. The process can be repeated to form additional layers. Of course, the second or subsequent gelatin layers may contain pieces of fruit, nuts, vegetable pieces in the first or subsequent layers to produce a multi-component gelatin dessert. Each layer can have it's own color, and compatible flavor such as cherry, strawberry, peach, orange, vanilla, lime, lemon, grape, etc.

The present invention provides a method for forming a paintable ornamental pattern onto a gelled dessert. For instance, a gellable liquid material can be used for the base and one or more kinds of solid materials such as pulps of fruit can be used to form a base layer having a top paintable layer formed from the mixture of the milk based ingredient and gelatin substrate.

The paint can be applied at room temperature, be applied as a flash freeze color product film and applied to the milk based product and gel substrate, or printed onto release paper, transfer paper, or wax paper for application thereto.

While a preferred embodiment will be an off white or cream colored substrate it is possible to incorporate colors therein to produce a light colored substrate serving as a base for painting with edible paints.

It is an object of the present invention to teach an improved method for forming designs upon certain food products, namely, gelatin based food products.

Another object is to provide a method whereby particular designs can be easily applied to a gelatin surface by following a simple set of instructions.

An object of this invention is to provide a method for adhering edible paint or dye to the surface of a gelatin mold.

An object of this invention is to provide a suitable surface for adhering edible paint or dye to a gelatin product.

It is another object of the present invention to provide a means for decorating a gelatin and milk based product including evaporated milk, whipping cream, heavy cream, milk, pudding, yogurt, cream cheese, eggs, cottage cheese, sour cream and combinations thereof.

It is an object of the present invention to provide a dessert which is ideal for diners who are allergic to egg white, wheat, and grain based products.

It is an object of the present invention to provide a dessert which is ideal for diners who are concerned about fat and cholesterol.

It is an object of the present invention to provide a gelatine product producible in an unlimited variety of shapes.

Another object of this invention is to provide a gelatin surface that will not allow the food coloring or dye to run or bleed.

It is another object of the present invention to provide a gelatin and milk based product mixture which can be tinted with a color creating a pastel colored icing capable of being painted with edible paint.

Another object of the present invention is provide a process suitable for both hand and automated operation.

In accordance with the present invention, a liquid material for a base is prepared and one or more kinds of liquid material for additional layer(s) are separately prepared. The mold is prepared and the liquid base is added. Additional layers are added. After the gelatin is set, the product is removed from the mold and ready for decoration. The food coloring or food dye is applied as described herein.

More particularly, an improved method of decorating a paintable substrate formed of gelatin and milk based products with designs, drawings, and paintings, using edible dyes, inks, and paints, comprise the steps of preparing a first layer by adding hot liquid into gelatin, stirring the hot liquid and the gelatin until it is completely dissolved in the water. Additional cold water may be used to mix with the dissolved gelatin to obtain the desired concentration prior to cooling and setting of the gelatin until it is set. The gelatin is allowed to set and cool and a cold milk based product selected from the group consisting of a yogurt, a pudding, a cream cheese, and combinations thereof into the gelatin and whisking forming a smooth layer of gelatin and milk based product mixture. A mold is prepared by lightly coating the mold surface with a release agent such as a nonsticking edible cooking spray, mayonnaise, salad dressing or the like.

The milk based product and gel mixture are poured into the mold and chilled until set forming a first gelatin and milk based substrate product layer or coating. The gelatin dessert typically includes a second layer prepared by dissolving a selected second preferably water based gelatin or gelatin containing flavored ingredients such as fruit or berries or combinations thereof which is spooned over the first gel and milk based product layer forming a bi-layer or multi-layer product containing a gelatin and milk based product layer in the bottom of the mold. The multi-layered product is chilled in the mold until set and then inverted in order to remove the mold leaving the multilayered product with the first gel and milk based product forming the top layer of the finished dessert which may be painted with edible paint, edible dye, edible water soluble ink, and combinations thereof. Of course the first gel and milk based product may be very thin forming a coating for an icing or frosting.

The present invention is directed to the field of culinary arts and more specifically to the field of a novel decorated gelatin product that is sculpted to appear to be a cake, although there is no" flour, wheat or the like products in said invention and is not the prior art of any prior culinary foods invention. The invention is the means by which asymmetrical, three dimensional sculpted glossy gelatin desserts, that when finished, look much like a glass or ceramic asymmetrical, three dimensional sculpted art piece (but, again, is completely edible), and is a multilayered edible dessert that could take the place of an edible wheat product, or the like, cake. This invention was formulated to fill a void in the culinary field, whereby cakes and cookies are the "celebration centerpiece dessert." A long felt need for a substitution was definitely needed to significantly change the culinary industry. The present invention is the perfect substitute for a high calorie wheat based, or the like, product. The instant inventions provide "celebration centerpiece desserts" and "individual serving desserts" that are lower in calories for the diet conscious (including current societal concerns of diabetes and weight management of adults and children alike). Six (6) of the product desserts are free of wheat. While four (4) of our product desserts are free of wheat and egg. Egg is used only in one of the product desserts. This provides a safe alternative for food allergy sufferers. In addition, the desserts can be formulated as sugar free.

The top gelatin based layers of "all" the dessert compositions contains ingredients of varying combinations of gelatin, heavy cream, sour cream, plain yogurt, eggnog, cream cheese, 2% milk, soy milk, and pudding powder some or all of which contain gum derivatives. The top layer compositions may also contain ingredient substitutes using varying combinations of skim milk, whole milk, evaporated milk, powdered milk, condensed milk, ice cream, cottage cheese, and the like. Decoration of top layer consists of using a soft gel paste coloring applied with a solid core (wooden or plastic handle) soft, flexible, filament brush. A paste is a soft smooth thick mixture or material comprising a smooth viscous mixture. Coloring may also be achieved with the depositing of already colored milk gelatin based product in the designated areas and/or flash frozen color, and the like.

The bottom layers of "all" the dessert compositions prepared by the instant process contain ingredients of varying combinations of gelatin, ginger ale, whole berry cranberry sauce, fresh navel oranges, fresh orange zest, canned mandarin oranges, fresh granny smith apples, slivered almonds, frozen strawberries, canned peaches, and frozen unsweetened raspberries. The bottom layer compositions may also contain ingredient substitutes using varying combinations of fruit flavored carbonated sodas, sparkling club soda, fruit flavored drinks, fruit flavored powders (such as KOOL-AID powder) fruit flavorings (imitation and/or real), orange juice, and the like.

The individual serving desserts are prepared with gelatin and milk based products. These desserts are cookie and/or bar shaped and can also be rendered in fun shapes such as holiday, sports, characters and the like. These desserts may also be created in variable pie shapes, and the like. These individual serving desserts provide the perfect surface for unique techniques in decorating. Decorating the desserts consist of concave convex mold line design, flow in, fill in, pipe on, pipe in, filament brush painted on, flash frozen color, air brush spray, transfer, lay on, 3-D embellishment, and the like.

The gelatin desserts are delicious, eye-catching and unique. Based upon meeting novel processing steps the instant invention provides unexpected and surprising results meeting the criteria of (1) having achieved an unexpected result when the ingredients of our invention were mixed together in view of the selection of the recipes featuring specific paintable substrates and paint formulated with a particular ingredient which provides a symbiotic means of combining a edible paintable substrate with a paint to eliminate bleeding of the colors for gelatin based applications.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF PREFERRED EMBODIMENT

Figure 1:
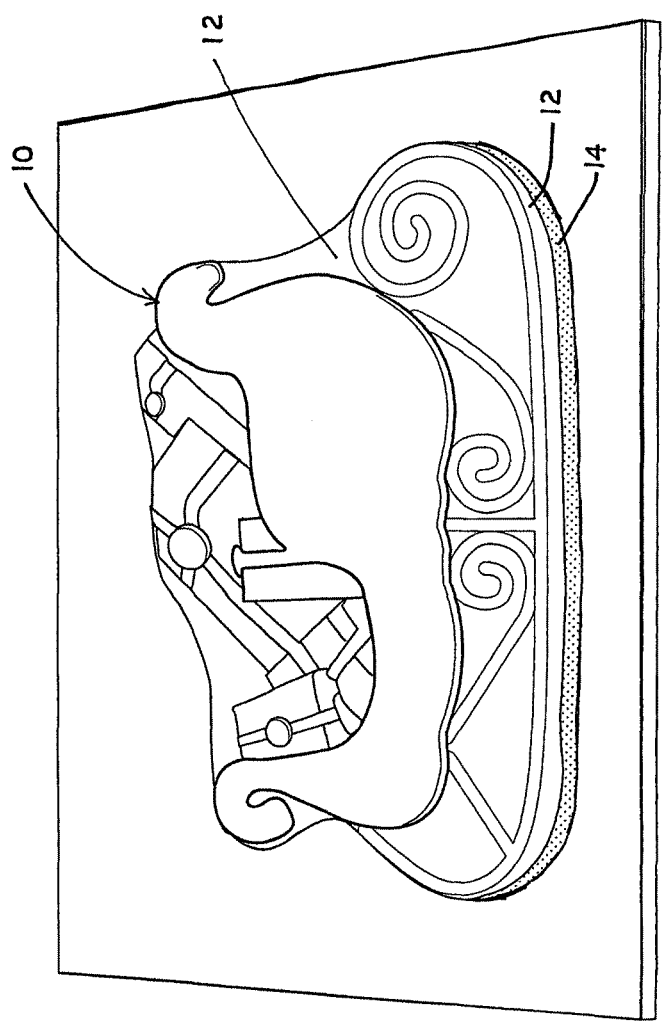
FIG. 1 is a top view showing a decorative gelatin dessert featuring a Christmas sleigh painted onto a top layer comprising a milk based eggnog and gelatin mixture and a bottom layer consisting of a fruit flavored gelatin.

As set forth in U.S. Pat. No. 5,417,990 which is incorporated by reference herein, gelled foods contain a gelled component which typically contain a water-soluble colorants. Gelled foods may be formulated containing a water soluble colorants and an agent which complexes with the colorants to product a water soluble complex which due to its size does not migrate within the gel matrix. Complexing agents deemed suitable for use include polyamino acids such as polyarginine, polylysine and polyhistidine, and protein materials which complexes the 8-anilino-1-naphtalene-sulfonic acid, such as serum albumin, egg protein, alcohol dehydrogenase and soluble fractions of wheat gluten and casinate.

The present invention relates to the formation of multi-layered and multi-colored gelatin based food products wherein one or more layers of gelatin based food products include a top and or interior layer composed of a mixture comprising a gelatin and a milk based product which upon setting forms a substrate which is paintable with either oil based colors without migration of the colors even after an extended period of time. Prevention of migration of the coloring agents is due to the formation of a gelatin and milk based mixture. While conventional gel food products may be formulated with particular complexing agents to prevent migration of layers of different colors, the present invention provides an alternate means of separation comprising a substrate which is impervious to oil dyes and paints and conventional food colorants thereby preventing migration of the colors throughout same.

Gelatin food products can be prepared so that they are ready for decorating upon removal from the mold or gelatin mold. The mold must be prepared by lightly greasing with mayonnaise or a non stick cooking spray to prevent the product from sticking to the mold. The milk base comprises at least one or a combination of pudding, milk, sour cream, cream cheese, yogurt, together with unflavored or flavored gelatins, water, an optionally with sugar, fruit juices, and/or various flavorings. The gelatin and milk based substrate is prepared using mixtures similar to the ones described in Tables 1-5. The gelatin and milk based substrate provides not only a palatable product but also a suitable medium for applying food paint, food coloring and/or food dye. The gelatin and milk based substrate is poured into the prepared mold and chilled. Once the gelatin and milk based substrate is almost set, an additional gelatin layer or layers may be added. The mold is allowed to chill for several hours. The mold is immersed in warm water just to the rim for approximately 15 seconds. The gelatin based food product can then be removed from the mold by placing a serving dish over the mold and turning it upside down.

Colorant and Paint and Gum Ingredients

The colorants or paint used in the instant invention must be compatible and resist bleeding when utilized with substrates containing ingredients such as vegetable gums which is a natural gum obtained from non-marine botanical resources. Natural gums obtained from seaweeds including agar, alginic acid and carrageenan to not appear to work in synergy with the gum contained in the gelatin substrate.

Gums are an especially important ingredient and a point of novelty in the present invention to provide a common base and compatibility of the paint and substrate (painted surface) in that both the most effective paint/colorants contains at least one natural vegetable gum derivative, and in some embodiments both the substrate and paint/colorants. Natural gums are typically water soluble gums. Natural vegetable gums are polysaccharides of natural origin, capable of causing a large viscosity increase in solution, even at small concentrations. In the food industry they are used as thickening agents gelling agents, emulsifying agents, and stabilizers. Often gums are found in the woody elements of plants or in seed coatings. Natural gums can be classified according to their origin. They can also be classified as uncharged or ionic polymers (polyelectrolytes).

As set forth in WIKIPEDIA.COM, natural gums can obtained from seaweeds include polyelectrolytes comprising agar, alginic acid, sodium alginate, and carrageenan do not appear to bind with the substrate of the present invention in a manner to prevent bleeding of the colorant within the gelatin.

Natural gums obtained from non-marine botanical resources are polyelectrolytes and natural vegetable gum appears to have a synergistic effect when combined with the gelatin forming the substrate for the present invention.

It is contemplated that other natural gums from non-marine botanical resources may be applicable to the present invention as well as vegetable gum; however, further research is warranted. Other non-marine natural gums include: gum arabic from the sap of acacia trees, gum ghatti from the sap of anogeissus trees, gum tragacanth from the sap of astragalus shrubs, and a karaya gum from the sap of sterculia trees. Uncharged gums comprise guar gum from guar beans, locust bean gum from the seeds of the carob tree, beta-glucan form oat or barley bran, chicle gum an older base for chewing gum obtained from the chicle tree, dammar gum from the sap of dipterocarpaceae trees, glucomannan from the konjac plant, mastic gum a chewing gum from ancient Greece obtained from the mastic tree, psyllium seed husks from the Plantago plant, spruce gum a chewing gum of American Indians obtained from spruce trees, and tara gum from the seeds of the tara tree. Moreover natural gums produced by bacterial fermentation which may be applicable include gelatin gum and xanthan gum which is a polysaccharide, derived from the bacterial coat of *Xanthomonas campestris*, used as a food additive and rheology modifier, commonly used as a food thickening agent and a stabilizer to prevent ingredients from separating. One of the most remarkable properties of xanthan gum is its ability to produce a large increase in the viscosity of a liquid by adding a very small quantity of gum, on the order of one percent. In most foods, it is used at 0.5%, and can be used in lower concentrations. The viscosity of xanthan gum solutions decreases with higher shear rates; this is called shear thinning or pseudoplasticity. This means that a product subjected to shear, whether from mixing, shaking or even chewing, will thin out, but once the shear forces are removed, the food will thicken back up. The xanthan gum makes it thick enough at rest in the bottle to keep the mixture fairly homogeneous, but the shear forces generated by shaking and pouring thins it, so it can be easily poured. When it exits the bottle, the shear forces are removed and it thickens hack up, so it clings to the salad. Unlike other gums, it is very stable under a wide range of temperatures and pH.

Gums used in foods help to prevent oil separation by stabilizing the emulsion, although it is not an emulsifier. Gum also helps suspend solid particles, such as spices. Also used in frozen foods and beverages, xanthan gum helps create the pleasant texture in many ice creams, along with guar gum and locust bean gum. Xanthan gum may serve as a binder to keep the product uniform. Xanthan gum (when sometimes not made from wheat is also used in gluten-free baking. Since the gluten found in wheat must be omitted, xanthan gum is used to give the dough or batter a "stickiness" that would otherwise be achieved with the gluten. Xanthan gum also helps thicken commercial egg substitutes made from egg whites, to replace the fat and emulsifiers found in yolks. It is also a preferred method of thickening liquids for those with swallowing disorders, since it does not change the color or flavor of foods or beverages at typical use levels.

To decorate the gelatin based food product an aqueous, oil, or solid edible paint, coloring or dye is used to create or provide color to the top of the finished product. One edible paint or colorants which contains a vegetable gum as an ingredient in the colorants is produced by AMERICOLOR, LLC. The AMERICOLOR products are used in the process described herein. Typically an AMERICOLOR formulated paint/colorants will comprise water, sugar, modified corn starch, vegetable gum, citric acid and less than $\frac{1}{10}$ of 1% sodium benzoate and potassium sorbate as a preservative, and may contain one or more of the following US certified colors (red 40, red 3, yellow 5, yellow 6, blue 1, blue 2, titanium dioxide).

The AMERICOLOR based paints/colorants containing a vegetable gum or gum derivative are applicable to all of the gelatin dessert based products of the present invention. The colorant applies easily and glides onto the gelatin substrate layer with the use of a soft filament brush. The color stays vivid and intense with the use of only one application resulting in no bleeding, spotting, streaking, smudging, or fading. After 72 hours the color saturation is still vivid and intense with the use of only one application resulting in no bleeding, spotting, streaking, smudging, or lading.

None of the colorant applicators or formulations provide an acceptable paint applicable to a gelatine based substrate:

Neither P&M's cake decorator pen, BETTY CROCKER EASY WRITER, nor AMERICOLOR GOURMET WRITER all of which are water based paint/colorants will work with the gel based substrate of the present invention. The P&M cake decorator pen is a tillable "insert" having a barrel and integral pointed tip and is filled with Great Value FC&C Yellow 5, but apparently no gum product. The AMERICOLOR GOURMET WRITER is reported to contain a water base paint/colorant containing water, propylene glycol, one of more colors selected from Red 3, Red 40, Blue 1, Blue 2, Yellow 5, Yellow 6, Citric Acid, less than $\frac{1}{10}$ of 1% sodium benzoate and potassium sorbate, but does not mention that it contains a gum or gum derivative.

The BETTY CROCKER EASY WRITER is a water based colorant/paint reported to containing water, propylene glycol, yellow 5, blue 1, red 3 or red 40, but no gum.

The GREAT VALUE colorant is a water based composition reported to contain water, propylene glycol, dye, and propylparaben applied by a filament brush, but no gum or gum derivative products and will not provide a suitable paint on the gelatin based substrate of the present invention that does not fade, spread, or bleed. upon application to the surface of the substrate.

CAKE MATE is a writing icing paste reported to contain sugar, water, corn syrup maltodextrine, corn starch, glycerin, natural and artificial flavor, partially hydrogenated vegetable oil, (soybean cottonseed), sodium alginate, colorant, salt, potassium sorbate, citric acid, calcium sulfate, mono and diglycerides and polysorbate but no gum or gum derivative products and will not provide a suitable paint on the gelatin based substrate of the present invention that does not fade, spread, or bleed upon application to the surface of the substrate.

The BETTY CROCKER gel food color reported to contain corn syrup, sugar, water, modified cornstarch, colorant, carrageenan, potassium sorbate, sodium benzoate and citric acid, but no gum or gum derivative products and will not provide a suitable paint on the gelatin based substrate of the present invention that does not fade, spread, or bleed. upon application to the surface of the substrate.

The CHEFMASTER gel is reported to contain water, glycerine, corn syrup, high fructose corn syrup, sugar, colorant, sorbitol, modified food starch, carrageenan gum, agar gum sodium benzoate and potassium sorbate, salt, and citric acid, but no vegetable gum or derivative products and will not provide a suitable paint on the gelatin based substrate of the present invention that does not fade, spread, or bleed. upon application to the surface of the substrate.

The COUNTY KITCHEN gel is reported to contain water, corn syrup, glycerine, high fructose corn syrup, sugar, colorant, modified food starch, carrageenan gum, agar gum, sodium benzoate, and potassium sorbate, salt, and citric acid, but no vegetable gum or derivative products and will not provide a suitable paint on the gelatin based substrate of the present invention that does not fade, spread, or bleed upon application to the surface of the substrate.

The WILTON gel is reported to contain water, corn syrup, high fructose corn syrup, glycerine, sugar, sorbitol, food starch-modified corn, carrageenan, agar gum, sodium benzoate, potassium sorbate, salt, and citric acid, but no vegetable gum or derivative products and will not provide a suitable paint on the gelatin based substrate of the present invention that does not fade, spread, or bleed. upon application to the surface of the substrate.

It is believed the natural vegetable gum or vegetable gum derivative in the colorant, ink, or paint is the key ingredient providing compatibility with the gum or gum derivatives and the gelling ingredients present in the substrate (gelatin containing gum and/or gum derivative) or surface to be painted therewith to effectively minimize and/or eliminate bleeding, diffusion, and/or migration of the colors from the paint into the surrounding gelatin substrate.

The paint, coloring, or dye is applied using art paint brushes having a soft flexible filament brush that serves a soft gel paste colorant applicator. The gelatin substrate upon which the paint or colorants is applied is pliable and conventional pens such as gel or felt tip pens disclosed in the prior art cannot be utilized with the present invention. However, it is contemplated that a pen could be developed wherein the colorant containing a gum or gum derivative flows onto an applicator such as a soft foam tip or brush or filament fibers transferable to the soft and pliable gelatin substrate. Templates may be used and it is contemplated that in an automated process, rollers, silk screening processes or spray and freeze processes may be utilized to apply the gum and/or gum derivative containing decorative colors and patterns to the gum and/or gum containing gelatin and milk based substrate layer.

Method of Painting:

Typically ¼ inch flat brushes and a #4 round brush may be utilized for most applications. A paste food coloring available from manufactures such as AMERICOLOR, LLC may be used to paint the gelatin. The ¼ inch brush may be used for large area coverage using long, even strokes pressing very gently. The #4 round brush is used for smaller more detailed areas.

The paint, coloring or dye is applied using art paint brushes. For instance, a dry brush technique involves using varying stroke of full color with strokes of very light color and is achieved by blotting a paint brush with a paper towel prior to applying light shades.

Optionally, an FDA approved food coloring may be mixed with the gelatin providing a background of a particular color prior to painting an image thereon with an edible paint and brush or a fiber-tipped pen filled with FDA approved food coloring or a paint pen may be used for decoration.

Figure 2:
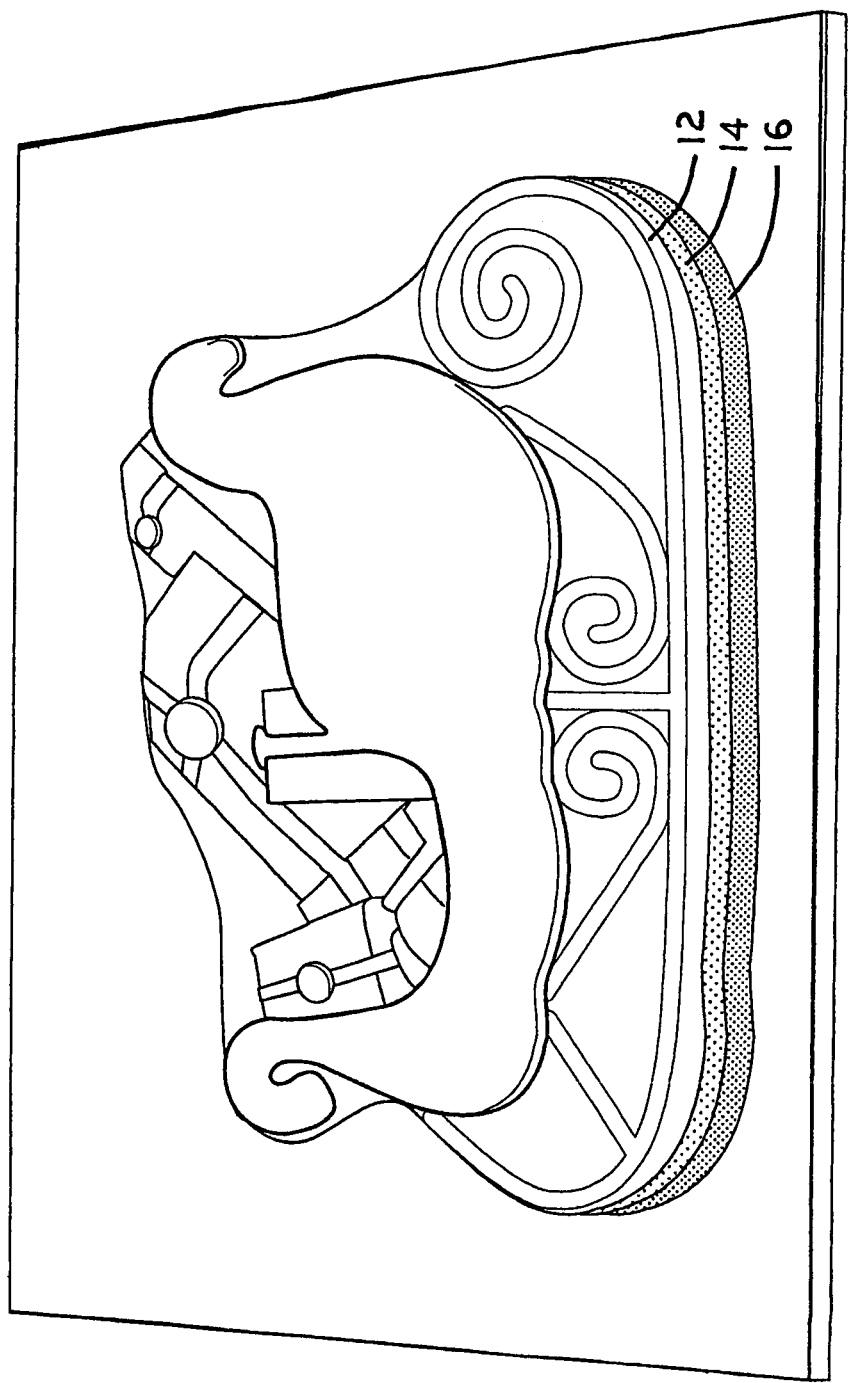
FIG. 2 shows the decorative gelatin dessert of FIG. 1 with an additional bottom layer of a different color gelatin.
Figure 3:
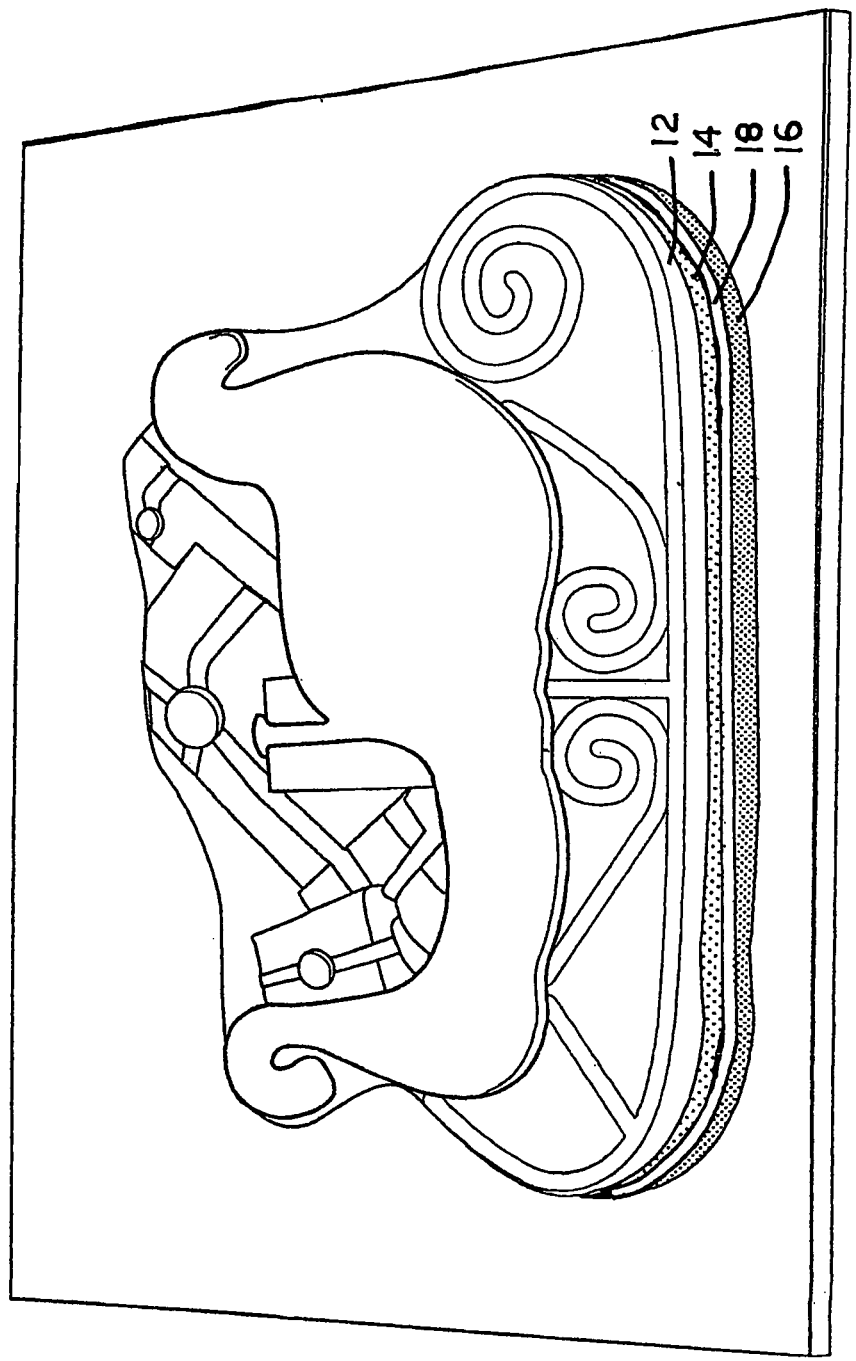
FIG. 3 shows an additional layer of a gelatin and milk based substrate disposed between different colored layers of gelatin.

As shown in FIG. 1, a decorative gelatin dessert 10 featuring a Christmas sleigh is showing having a top paintable layer 12 comprising a milk based eggnog and gelatin mixture and a second layer 14 consisting of a fruit flavored gelatin. FIG. 2 shows the addition of a third layer 16 of a different color gelatin. FIG. 3 shows an additional layer of a gelatin and milk based substrate 18 disposed between different colored second layer of gelatin 14 and third layer of gelatin 16.

Food molds can be obtained from manufacturers such as CK PRODUCTS in Fort Wayne, Ind.

The following pages contain examples of combinations of ingredients for both a top layer and a bottom layer. The top layers in the examples provide a surface which is paintable with the decorative paint mixtures of the present invention.

| | | Example No. 1 Turkey Mold Cranberry Pride Top Layer Ingredients |
|---|---|---|
| 170 g | 19.1% | Orange Gelatin |
| 480 mL | 53.9% | Orange Juice (heated to 180° F.) |
| 240 g | 27.0% | Plain Yogurt (chilled) |

Prepare Mold

Prepare mold by lightly coating with mayonnaise, about 9 g—or lightly spray with non-stick cooking spray.

Preparation of Top Layer

In medium bowl stir heated orange juice into orange gelatin powder. Stir 2 minutes or until completely dissolved. Place bowl in ice bath for a quick set. Stir until cooled slightly, approximately 8 to 10 minutes. Add chilled plain yogurt. Whisk until smooth.

Pour Top Layer

Pour combined top layer mixture into prepared mold. Tap gently to remove any air bubbles. Refrigerate until set approximately 35 to 40 minutes.

| | | Bottom Layer Ingredients |
|---|---|---|
| 170 g | 11.3% | Cranberry Gelatin |
| 480 mL | 31.8% | Boiling Water (212° F.) |
| 240 mL | 15.9% | Ginger Ale (chilled) |
| 397 g | 26.3% | Whole Berry Cranberry Sauce (chilled) |
| 200 g | 13.3% | Fresh Navel Oranges (chilled, peeled and diced) (approximately 2 medium size oranges) |
| 14.3 g | 0.9% | Granulated Sugar |
| 6 g | 0.4% | Fresh Orange Zest or may use 10 mL Orange Flavoring or Extract |

Preparation of Bottom Layer

In a medium bowl, dissolve cranberry gelatin powder in boiling water of 212° F. Add chilled Ginger Ale and stir well. Place in ice bath. Stir gently until partially set, approximately 8 to 10 minutes. Fold in chilled whole berry cranberry sauce, chilled diced oranges, sugar and orange zest.

Remove Chilled Top Layer Mold from Refrigerator and Pour Bottom Layer

Chilled temperature of top layer upon pouring of bottom layer is between 59 to 69° F. Prepare for second layer by running a fork over the surface of the top layer of gelatin making indention lines for the gelatin layers to adhere. Spoon contents of bottom layer over top layer making sure the gelatin mixture covers completely to the outer edge of the mold. Refrigerate 12 to 24 hours.

Unmolding

To unmold dessert place backside of wooden spoon on top of gelatin, close to edge. Press gently toward center, around entire edge, to loosen. Invert plate on top of gelatin dessert mold and while holding plate in place, gently flip over. Place warmed tea towel over mold pan for 15 to 20 seconds and remove. Temperature at this point is 40° F. to 42° F.

Total net weight of completed gelatin mold (when placing in fridge for chilling overnight)=2.121. kg Total net weight of completed gelatin mold (after being chilled overnight for 24 hour period)=2.359 kg

| Weights and Measures for Example No. 1 | |
|---|---|
| Asymmetrical Pan Height | 4.5 cm |
| Asymmetrical Pan Water Weight | 2.181 kg |
| Top Layer Poured Temperature | 69° F. |
| Top Layer Poured Weight | 973 g |
| Top Layer Chilled Temperature | 69° F. |
| Top Layer Chilled Weight | 536 g |
| Bottom Layer Poured Temperature | 59° F. to 60° F. |
| Bottom Layer Poured Weight | 1.960 kg |
| Bottom Layer Chilled Temperature | 50° F. |
| Bottom Layer Chilled Weight | 2.121 kg |
| Total Temperature of Whole after 24 Hours Refrigeration | 40° F. to 42° F. |
| Total Weight of Whole after 24 Hours Refrigeration | 2.359 kg |

| Example No. 2 Christmas Sleigh Christmas Mold Top Layer Ingredients | | |
|---|---|---|
| 170 g | 14.9% | Lemon Gelatin |
| 480 mL | 42.1% | Boiling Water (212° F.) |
| 10 mL | 1% | Rum Extract |
| 480 mL | 42.1% | Canned Eggnog (chilled) |

Prepare Mold

Prepare mold by lightly coating with mayonnaise, about 9 g—or lightly spray with non-stick cooking spray.

Preparation of Top Layer

In large bowl, pour boiling water over lemon gelatin. Stir until dissolved—about 2 minutes. Add rum extract and chilled canned eggnog. Place in ice bath for 12 to 15 minutes.

Pour Top Layer

Pour combined top layer mixture into prepared mold. Tap gently to remove any air bubbles. Refrigerate until set approximately 45 minutes to 1 hour.

| Bottom Layer Ingredients | | |
|---|---|---|
| 350 g | 23.5% | Canned Mandarin Orange Segments (chilled, drained and cut in half) (reserve juice for later use) |
| 125 g | 8.4% | Granny Smith Apples (chilled, peeled and diced) |
| 170 g | 11.4% | Cherry Gelatin |
| 480 mL | 32.3% | Boiling Water (212° F.) |
| 240 mL | 16.1% | Reserved Juice from Canned Mandarin Oranges |
| 123 g | 8.3% | Slivered Almonds (chopped) |

Preparation of Bottom Layer

In large bowl dissolve cherry gelatin in boiling water. Stir until totally dissolved. Slowly pour in orange juice while whisking thoroughly. Place bowl of gelatin mixture in ice bath, stirring until partially set—approximately 6 to 8 minutes. Fold in chilled chopped apples, chilled orange segments, and chopped almonds.

Remove Chilled Top Layer Mold from Refrigerator and Pour Bottom Layer

Chilled temperature of top layer upon pouring of bottom layer is between 60° F. to 68° F. Prepare for second layer by running a fork over the surface of the top layer of gelatin making indention lines for the gelatin layers to adhere. Spoon contents of bottom layer over top layer making sure the gelatin mixture covers completely to the outer edge of the mold. Refrigerate 12 to 24 hours.

Unfolding

To unmold dessert place backside of wooden spoon on top of gelatin, close to edge. Press gently toward center, around entire edge, to loosen. Invert plate on top of gelatin dessert mold and while holding plate in place, gently flip over. Place warmed tea towel over mold pan for 15 to 20 seconds and remove. Temperature at this point is 40° F. to 42° F.

Total net weight of completed gelatin mold (when placing in fridge for chilling overnight)=2.545 kg Total net weight of completed gelatin mold (after being chilled overnight for 24 hour period)=2.515 kg

| Weights and Measures for Example No. 2 | |
|---|---|
| Asymmetrical Pan Height | 3.75 cm |
| Asymmetrical Pan Water Weight | 2.077 kg |
| Top Layer Poured Temperature | 69° F. to 70° F. |
| Top Layer Poured Weight | 1.046 kg |
| Top Layer Chilled Temperature | 59° F. to 68° F. |
| Top Layer Chilled Weight | 1.029 kg |
| Bottom Layer Poured Temperature | 65° F. |
| Bottom Layer Poured Weight | 1.959 kg |
| Bottom Layer Chilled Temperature | 52° F. |
| Bottom Layer Chilled Weight | 2.545 kg |
| Total Temperature of Whole after 24 Hours Refrigeration | 40° F. to 42° F. |
| Total Weight of Whole after 24 Hours Refrigeration | 2.515 kg |

| Example No. 3 Baby Carriage Mold Strawberry Pleasure Top Layer Ingredients | | |
|---|---|---|
| 7 g | .9% | Unflavored Gelatin |
| 240 mL | 31.9% | Bottled Water (chilled) |
| 240 mL | 31.9% | Boiling Water (212° F.) |
| 34 g | 4.5% | Granulated Sugar |
| 5 mL | 0.7% | Clear Vanilla |
| 226 g | 30.1% | Cream Cheese |

Prepare Mold
Prepare mold lightly coating with mayonnaise, about 9 g—or lightly spray with non-stick cooking spray.
Preparation of Top Layer
In small bowl sprinkle unflavored gelatin over chilled water. Let stand for 1 minute. Add boiling water and stir until dissolved. In medium mixing bowl, add sugar and vanilla to cream cheese. Beat until smooth—approximately 5 minutes. Slowly pour gelatin mixture into cream cheese. Whisk together until smooth.
Pour Top Layer
Pour combined top layer mixture into prepared mold. Tap gently to remove any air bubbles. Refrigerate until set—approximately 45 minutes to 1 hour.

| Bottom Layer Ingredients | | |
| --- | --- | --- |
| 340 g | 21.6% | Strawberry Gelatin |
| 720 mL | 45.8% | Boiling Water (212° F.) |
| 240 mL | 15.3% | Bottled Water (chilled) |
| 273 g | 17.4% | Frozen Strawberries (partially thawed and gently mashed) |

Preparation of Bottom Layer
In large bowl stir boiling water into gelatin. Stir 2 minutes or until completely dissolved. Add chilled water and stir well. Chill in refrigerator until partially set approximately 15 to 20 minutes. Fold in cold mashed strawberries.
Remove Chilled Top Layer Mold from Refrigerator and Pour Bottom Layer
Chilled temperature of top layer upon pouring of bottom layer is between 59° F. to 69° F. Prepare for second layer by running a fork over the surface of the top layer of gelatin making indention lines for the gelatin layers to adhere. Spoon contents of bottom layer over top layer making sure the gelatin mixture covers completely to the outer edge of the mold. Refrigerate 12 to 24 hours.
Unmolding
To unmold dessert place backside of wooden spoon on top of gelatin, close to edge. Press gently toward center, around entire edge, to loosen. Invert plate on top of gelatin dessert mold and while holding plate in place, gently flip over. Place warmed tea towel over mold pan for 15 to 20 seconds and remove. Temperature at this point is 40° F. to 42° F.
Total net weight of completed gelatin mold (when placing in fridge for chilling overnight)=2.290 kg
Total net weight of completed gelatin mold (after being chilled overnight for 24 hour period)=2.255 kg

| Weights and Measures for Example No. 3 | |
| --- | --- |
| Asymmetrical Pan Height | 3.5 cm to 4.5 cm |
| Asymmetrical Pan Water Weight | 1.998 kg |
| Top Layer Poured Temperature | 69° F. to 70° F. |
| Top Layer Poured Weight | 422 g |
| Top Layer Chilled Temperature | 69° F. |
| Top Layer Chilled Weight | 831 g |
| Bottom Layer Poured Temperature | 69° F. |
| Bottom Layer Poured Weight | 1.491 kg |
| Bottom Layer Chilled Temperature | 48° F. |
| Bottom Layer Chilled Weight | 2.290 kg |
| Total Temperature of Whole after 24 Hours Refrigeration | 40° F. to 42° F. |
| Total Weight of Whole after 24 Hours Refrigeration | 2.255 kg |

| Example No. 4 Horse Mold Peachy Razz Top Layer Ingredients | | |
| --- | --- | --- |
| 96 g | 10.7% | Vanilla Pudding Powder |
| 85 g | 9.4% | Peach Gelatin |
| 480 mL | 53.3% | 2% Milk (chilled) |
| 240 mL | 26.6% | Boiling Water (212° F.) |

Prepare Mold
Prepare mold by lightly coating with mayonnaise, about 9 g—or lightly spray with non-stick cooking spray.
Preparation of Top Layer
In small bowl pour boiling water over peach gelatin. Whisk until dissolved. Cool slightly—approximately 5 minutes. In medium bowl sprinkle vanilla pudding powder over chilled milk and whisk until creamy. Slowly pour gelatin mixture into pudding mixture, while whisking until very smooth.
Pour Top Layer
Pour combined top layer mixture into prepared mold. Tap gently to remove any air bubbles. Refrigerate until set, approximately 45 minutes to 1 hour.

| Bottom Layer Ingredients | | |
| --- | --- | --- |
| 170 g | 12.7% | Raspberry Gelatin |
| 450 g | 33.6% | Canned Sliced Peaches (chilled and diced) |
| 480 mL | 35.8% | Boiling Water (212° F.) |
| 240 mL | 17.9% | Bottled Water (chilled) |

Preparation of Bottom Layer
In a medium bowl pour boiling water over raspberry gelatin. Stir until dissolved—approximately 2 minutes. Stir in chilled water. Place in refrigerator. Chill approximately 15 to 20 minutes, until partially set. Remove from refrigerator and fold in chilled diced peaches.
Remove Chilled Top Layer Mold from Refrigerator and Pour Bottom Layer
Chilled temperature of top layer upon pouring of bottom layer is between 59° F. to 70° F. Prepare for second layer by running a fork over the surface of the top layer of gelatin making indention lines for the gelatin layers to adhere. Spoon contents of bottom layer over top layer making sure the gelatin mixture covers completely to the outer edge of the mold. Refrigerate 12 to 24 hours.
Unmolding
To unmold dessert place backside of wooden spoon on top of gelatin, close to edge. Press gently toward center, around entire edge, to loosen. Invert plate on top of gelatin dessert mold and while holding plate in place, gently flip over. Place warmed tea towel over mold pan for 15 to 20 seconds and remove. Temperature at this point is 40° F. to 42° F.
Total net weight of completed gelatin mold (when placing in fridge for chilling overnight)=2.197 kg
Total net weight of completed gelatin mold (after being chilled overnight for 24 hour period)=2.115 kg

| Weights and Measures for Example No. 4 | |
| --- | --- |
| Asymmetrical Pan Height | 3.25 cm to 4.5 cm |
| Asymmetrical Pan Water Weight | 2.044 kg |
| Top Layer Poured Temperature | 76° F. |
| Top Layer Poured Weight | 965 g |
| Top Layer Chilled Temperature | 69° F. to 70° F. |
| Top Layer Chilled Weight | 958 g |
| Bottom Layer Poured Temperature | 69° F. to 70° F. |

| Weights and Measures for Example No. 4 | |
|---|---|
| Bottom Layer Poured Weight | 1.283 kg |
| Bottom Layer Chilled Temperature | 55° F. |
| Bottom Layer Chilled Weight | 2.197 kg |
| Total Temperature of Whole after 24 Hours Refrigeration | 42° F. to 55° F. |
| Total Weight of Whole after 24 Hours Refrigeration | 2.115 kg |

Example No. 5 Train Mold
Raspberry Pizazz
Top Layer Ingredients

| | | |
|---|---|---|
| 480 mL | 47% | Heavy Cream |
| 158 g | 15.7% | Granulated Sugar |
| 7 g | 0.7% | Unflavored Gelatin |
| 15 mL | 1.5% | Clear Vanilla Extract |
| 5 mL | 0.5% | Almond Extract |
| 341 g | 33.9% | Sour cream (chilled) |

Prepare Mold
Prepare mold by lightly coating with mayonnaise, about 9 g—or lightly spray with non-stick cooking spray.
Preparation of Top Layer
In 1½ to 2 quart sauce pan, combine heavy cream and sugar. Place over medium heat. Cook (stirring constantly) until candy thermometer reaching 160° F. (Do not boil). Remove sauce pan from heat. Stir in unflavored gelatin until dissolved. Add almond and vanilla extracts. Cool 15 minutes. Whisk in chilled sour cream.
Pour Top Layer
Pour combined top layer mixture into prepared mold. Tap gently to remove any air bubbles. Refrigerate until set, approximately 45 minutes to 1 hour.

| Bottom Layer Ingredients | | |
|---|---|---|
| 255 g | 17.4% | Raspberry Gelatin |
| 480 mL | 32.8% | Boiling Water (212° F.) |
| 480 mL | 32.8% | Bottled Water (chilled) |
| 219 g | 15.0% | Frozen Unsweetened Raspberries (partially thawed) |
| 28 g | 1.9% | Granulated Sugar |

Preparation of Bottom Layer
In a medium bowl dissolve raspberry gelatin into boiling water. Stir until dissolved—approximately 2 minutes. Add chilled water. Stir well. Place in refrigerator—approximately 15 to 20 minutes until partially set. In a second small bowl, toss chilled, partially thawed raspberries with granulated sugar. Remove first bowl containing gelatin mixture from refrigerator and fold in chilled, partially thawed raspberries from second bowl.
Remove Chilled Top Layer Mold from Refrigerator and Pour Bottom Layer
Chilled temperature of top layer upon pouring of bottom layer is between 59° F. to 65° F. Prepare for second layer by running a fork over the surface of the top layer of gelatin making indention lines for the gelatin layers to adhere. Spoon contents of bottom layer over top layer making sure the gelatin mixture covers completely to the outer edge of the mold. Refrigerate 12 to 24 hours.
Unmolding
To unmold dessert place backside of wooden spoon on top of gelatin, close to edge. Press gently toward center, around entire edge, to loosen. Invert plate on top of gelatin dessert mold and while holding plate in place, gently flip over. Place warmed tea towel over mold pan for 15 to 20 seconds and remove. Temperature at this point is 40° F. to 42° F.
Total net weight of completed gelatin mold (when placing in fridge for chilling overnight)=2.282 kg
Total net weight of completed gelatin mold (after being chilled overnight for 24 hour period 2.202 kg

| Weights and Measures for Example No. 5 | |
|---|---|
| Asymmetrical Pan Height | 2.5 cm to 3.5 cm |
| Asymmetrical Pan Water Weight | 1.969 kg |
| Top Layer Poured Temperature | 78° F. to 80° F. |
| Top Layer Poured Weight | 1.057 kg |
| Top Layer Chilled Temperature | 65° F. |
| Top Layer Chilled Weight | 620 g |
| Bottom Layer Poured Temperature | 65° F. |
| Bottom Layer Poured Weight | 1.993 kg |
| Bottom Layer Chilled Temperature | 55° F. |
| Bottom Layer Chilled Weight | 2.282 kg |
| Total Temperature of Whole after 24 Hours Refrigeration | 40° F. to 42° F. |
| Total Weight of Whole after 24 Hours Refrigeration | 2.202 kg |

Example No. 6 Heart Mold
Sugar Free Peach Raspberry
Top Layer Ingredients

| | | |
|---|---|---|
| 480 mL | 63.5% | Cold Milk — or may use Soy Milk (unsweetened) |
| 28 g | 3.7% | Vanilla Pudding Powder (Sugar Free) |
| 8.5 g | 1.1% | Peach Gelatin (Sugar Free) |
| 240 mL | 31.7% | Boiling Water (212° F.) |

Prepare Mold
Prepare mold by lightly coating with mayonnaise, about 9 g—or lightly spray with non-stick cooking spray.
Preparation of Top Layer
In small bowl pour boiling water over peach gelatin. Whisk until dissolved. Cool slightly—approximately 5 minutes. In medium bowl sprinkle vanilla pudding powder over chilled milk and whisk until creamy. Slowly pour gelatin mixture into pudding mixture, while whisking until very smooth.
Pour Top Layer
Pour combined top layer mixture into prepared mold. Tap gently to remove any air bubbles. Refrigerate until set, approximately 45 minutes to 1 hour.

| Bottom Layer Ingredients | | |
|---|---|---|
| 17 g | 1.7% | Raspberry Gelatin (Sugar Free) |
| 266 g | 26.5% | Diced Peaches (Canned) (Sugar Free) |
| 480 mL | 47.9% | Boiling Water (212° F.) |
| 240 mL | 23.9% | Bottled Water (Chilled) |

Preparation of Bottom Layer
In a medium bowl pour boiling water over raspberry gelatin. Stir until dissolved—approximately 2 minutes. Stir in chilled water. Place in refrigerator. Chill approximately 15 to 20 minutes, until partially set. Remove from refrigerator and fold in chilled diced peaches.
Remove Chilled Top Layer Mold from Refrigerator and Pour Bottom Layer
Chilled temperature of top layer upon pouring of bottom layer is between 59° F. to 70° F. Prepare for second layer by running a fork over the surface of the top layer of gelatin making indention lines for the gelatin layers to adhere. Spoon contents of bottom layer over top layer making sure the gelatin mixture covers completely to the outer edge of the mold. Refrigerate 12 to 24 hours.

Unmolding

To unmold dessert place backside of wooden spoon on top of gelatin, close to edge. Press gently toward center, around entire edge, to loosen. Invert plate on top of gelatin dessert mold and while holding plate in place, gently flip over. Place warmed tea towel over mold pan for 15 to 20 seconds and remove. Temperature at this point is 40° F. to 42° F.

Total net weight of completed gelatin mold (when placing in fridge for chilling overnight)=1.756 kg Total net weight of completed gelatin mold (after being chilled overnight for 24 hour period)=1.706 kg

| Weights and Measures for Example No. 6 | |
|---|---|
| Asymmetrical Pan Height | 5 cm |
| Asymmetrical Pan Water Weight | 1.927 kg |
| Top Layer Poured Temperature | 70° F. |
| Top Layer Poured Weight | 817 g |
| Top Layer Chilled Temperature | 69° F. to 70° F. |
| Top Layer Chilled Weight | 813 g |
| Bottom Layer Poured Temperature | 60° F. to 62° F. |
| Bottom Layer Poured Weight | 1.943 kg |
| Bottom Layer Chilled Temperature | 50° F. |
| Bottom Layer Chilled Weight | 1.756 kg |
| Total Temperature of Whole after 24 Hours Refrigeration | 42° F. to 50° F. |
| Total Weight of Whole after 24 Hours Refrigeration | 1.706 kg |

| Example No. 7 Concave/Convex Cream Cheese Ingredients | | |
|---|---|---|
| 7 g | 0.9% | Unflavored Gelatin |
| 240 mL | 31.9% | Bottled Water (chilled) |
| 240 mL | 31.9% | Boiling Water (212° F.) |
| 34 g | 4.5% | Granulated Sugar |
| 5 mL | 0.7% | Clear Vanilla |
| 226 g | 30.1% | Cream Cheese |

Prepare Mold

May use a 8×8 square pan. Lightly spray with non-stick cooking spray.

Preparation of Ingredients

In small bowl sprinkle unflavored gelatin over chilled water. Let stand for 1 minute. Add boiling water and stir until dissolved. In a medium mixing bowl add sugar and vanilla to cream cheese. Beat until smooth—approximately 5 minutes. Slowly pour gelatin mixture into cream cheese. Whisk together until smooth. Pour combined mixture into prepared mold. Tap gently to remove any air bubbles. Refrigerate until set, approximately 24 hours.

Unmolding

To unmold dessert place backside of wooden spoon on top of gelatin, close to edge. Press gently toward center, around entire edge, to loosen. Invert plate on top of gelatin dessert mold and while holding plate in place, gently flip over. Temperature at this point is 42° F. to 60° F.

Bar Size=5.8 cm×7.9 cm

Bar Height=1.5 cm

Bar Weight=74 g (Temperature 58° F.)

| Weights and Measures for Example No. 7 | |
|---|---|
| Square Pan Size | 8 × 8 inches |
| Water Measurement | 960 mL |
| Serving Bar Size | 6.6 cm × 6.4 cm |
| Serving Bar Height | 1.5 cm |
| Serving Bar Temperature | 60° F. |
| Serving Bar Weight | 85 g |

| Example No. 8 Concave/Convex Pudding Milk/Soy Milk Ingredients | | |
|---|---|---|
| 96 g | 14.5% | Vanilla Pudding Powder |
| 85 g | 12.9% | Peach Gelatin Powder |
| 240 mL | 36.3% | Milk or Soy Milk (chilled) |
| 240 mL | 36.3% | Boiling Water (212° F.) |

Prepare Mold

May use an 6×6 square pan. Lightly spray with non-stick cooking spray.

Preparation of Ingredients

In small bowl pour boiling water over peach gelatin. Whisk until dissolved. Cool slight—approximately 5 minutes. In medium bowl, sprinkle vanilla pudding powder over chilled milk and whisk until creamy. Slowly pour gelatin mixture into pudding mixture, while whisking until very smooth. Refrigerate until set, approximately 24 hours.

Unmolding

To unmold dessert place backside of wooden spoon on top of gelatin, close to edge. Press gently toward center, around entire edge, to loosen. Invert plate on top of gelatin dessert mold and while holding plate in place, gently flip over. Temperature at this point is 42° F. to 60° F.

Bar Size=6.6 cm×6.4 cm

Bar Height=1.5 cm

Bar Weight=85 g (Temperature 60° F.)

| Weights and Measures for Example No. 7 | |
|---|---|
| Square Pan Size | 6 × 6 inches |
| Water Measurement | 1.9200 L |
| Serving Bar Size | 6.6 cm × 6.4 cm |
| Serving Bar Height | 1.5 cm |
| Serving Bar Temperature | 160° F. |
| Serving Bar Weight | 85 g |

| Example No. 9 Decorating Gelatin Ingredients | | |
|---|---|---|
| 150 mL | 63.8% | Boiling Water (212° F.) |
| 85 g | 36.2% | Flavored Gelatin Powder |

Preparation:

Mix gelatin powder into boiling water. Stir until dissolved, approximately 3 minutes. Place howl in ice bath and chill to about 50° F. Place in decorator bag (fitted with decorator tip #3). Deposit the decorating gelatin into the concave mold cavity (make sure the cavity is completely filled). Tap gently to remove any air bubbles. Place in refrigerator. Chill for 1 to 2 hours.

When pouring milk gelatin recipe into mold, temperature can be between 65° F. to 80° F.

When unmolding recipe, temperature should be between 42° F. to 45° F.

A list of ingredients for various gelatin and milk based substrates is as follows:

Table 1. Base 1
1 envelope unflavored gelatin
1 cup cold water
1 cup hot water
2 TBS. Granulated Sugar
1 Tsp. Clear Vanilla
1 8 oz. package cream cheese Table 2. Base 2
1 box vanilla pudding
1 box peach gelatin
2 cups cold milk
1 cup boiling water Table 3. Base 3
2 cups heavy cream
¾ cup granulated sugar
1 envelope unflavored gelatin
3 tsp. vanilla extract
1 tsp. almond extract
1½ cups sour cream Table 4. Base 4
1 3 oz. box orange gelatin
1 cup heated orange juice
1 8 oz. plain yogurt Table 5. Base 5
2 3 oz. boxes lemon gelatin
2 cups boiling water
2 tsp rum extract
2 cups chilled canned eggnog Example 10

Gelatin/Cream Cheese:
Preparation of 1$^{st}$ Layer:
1) Sprinkle one envelope of unflavored gelatin available from manufactures such as JELL-O-GELATIN from KRAFT FOODS, INC, in Glenview, Ill., over one cup of cold water and let stand for one minute. Add one cup of hot water and stir until dissolved forming a gelatin mixture.
2) Add sugar and vanilla to cream cheese such as PHILADELPHIA CREAM CHEESE available from KRAFT FOODS, INC, in Glenview, Ill., and beat for about 2 minutes or until smooth.
3) Pour gelatin mixture into the cream cheese slowly and whisk together until smooth.
4) Pour the combined mixture into a mold treated with a nonstick cooking spray or mayonnaise and tap on counter top to release any air bubbles forming a cream cheese gel mixture.
5) Chill until set.
Preparation of Second Layer:
1) Add two 6 ounce boxes of gelatin into three cups of boiling water and stir for two minutes or until completely dissolved.
2) Add two cups of ice cubes and stirs until the gelatin is partially thickened and the ice has melted.
3) Fold in two cups of cold mashed fruit or berries.
4) Spoon over already set cream cheese gel mixture.
5) Chill until set.
To Remove the Mold:
1) Immerse the mold in warm water (just to the rim) for 15 to 20 seconds.
2) Place the plate on top of the mold, turning the mold and plate over and lift the mold off leaving the finished product on the plate as shown in FIG. 1.

Example 11

Gelatin/Pudding:
Preparation of 1$^{st}$ Layer:
1) Sprinkle one envelope of fruit or berry flavored gelatin over one cup of cold water and let stand for one minute. Add one cup of hot water and stir until dissolved forming a gelatin mixture.
2) Sprinkle vanilla pudding over two cups of cold milk and whisk until creamy.
3) Pour gelatin mixture into the cream cheese slowly and whisk together until smooth.
4) Pour the combined mixture into a mold treated with a nonstick cooking spray or mayonnaise and tap on counter top to release any air bubbles forming a pudding gel mixture.
5) Chill until set.
Preparation of Second Layer:
1) Pour two cups of boiling water over a fruit or berry gelatin of boiling water and stir for two minutes or until completely dissolved.
2) Add one cup of ice cubes and stir until the gelatin is partially thickened and the ice has melted.
3) Place in refrigerator to chill for about ten minutes.
4) Fold in two cups of cold mashed fruit or berries.
4) Spoon over already set pudding gel mixture.
5) Chill until set.
To Remove the Mold:
1) Immerse the mold in warm water (just to the rim) for 15 to 20 seconds.
2) Place the plate on top of the mold, turning the mold and plate over and lift the mold oil leaving the finished product on the plate.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:

1. An edible painted gelatin milk substrate layer of a food product consisting essentially of:
    a gelatin based substrate mixed with a milk based product forming a gelatin based milk substrate, which upon chilling sets forming a colloidal semi-solid gelatin milk substrate;
    at least one edible coloring agent selected from the group consisting of an oil soluble edible dye, an oil soluble edible ink, an oil soluble edible paint, and combinations thereof containing a vegetable gum or vegetable gum derivative;
    said milk based product is selected from the group consisting of evaporated milk, whipping cream, heavy cream, milk, pudding, yogurt, cream cheese, eggnog, cottage cheese, sour cream, skim milk, whole milk, soy milk, powdered milk, condensed milk, 2% milk, ice cream, and combinations thereof; and
    said gelatin based substrate containing a gelatin;
    a selected surface of said gelatin milk substrate is painted with said at least one edible coloring agent without migration or bleeding of said at least one edible coloring agent into an area surrounding said selected surface of said gelatin milk substrate for up to 72 hours.

2. The edible painted gelatin milk substrate layer of a food product of claim 1, wherein said vegetable gum or vegetable gum derivative is selected from the group consisting of gum arabic, guar gum, locust bean gum, gelatin gum, xanthan gum, and combinations thereof.

3. A painted gelatin based food product, comprising:
- an upper layer including a gelatin based substrate mixed with a milk based product forming a gelatin based milk substrate, which upon chilling sets forming a colloidal semi-solid gelatin milk substrate;
- said milk based product is selected from the group consisting of evaporated milk, whipping cream, heavy cream, milk, pudding, yogurt, cream cheese, eggnog, 2% milk, cottage cheese, sour cream, skim milk, whole milk, soy milk, powdered milk, condensed milk, ice cream, and combinations thereof;
- at least one edible coloring agent selected from the group consisting of an oil soluble edible dye, an oil soluble edible ink, an oil soluble edible paint, and combinations thereof containing a vegetable gum or vegetable gum derivative;
- said gelatin comprising a gelatin;
- a lower layer comprising a food article;
- a selected surface of said gelatin milk substrate is painted with said least at least one edible coloring agent without migration or bleeding of said at least one edible coloring agent into an area surrounding said selected surface of said gelatin milk substrate for up to 72 hours.

4. The painted gelatin food product of claim 3 including an additional layer containing a gelatin and ingredients selected from the group consisting of a selected flavor, fruit juice, fruit, berry, nut, vegetable, carbonated soda, fruit flavored carbonated soda, sparkling club soda, fruit flavored drink, fruit flavored powder, flavorant, bean, bean extract, nut extract, and combinations thereof.

5. The painted gelatin based food product of claim 3, including a natural gum selected from the group consisting of gum arabic, guar gum, locust bean gum, gelatin gum, xanthan gum, and combinations thereof.

6. A gelatin based food product having a painted decorative surface, comprising:
- a gelatin based substrate mixed with a milk based product forming a gelatin based milk substrate, which upon chilling sets forming a colloidal semi-solid gelatin milk substrate;
- said milk based product is selected from the group consisting of evaporated milk, 2% milk, whipping cream, heavy cream, milk, pudding, yogurt, cream cheese, eggnog, cottage cheese, sour cream, skim milk, whole milk, powdered milk, soy milk, condensed milk, ice cream, and combinations thereof;
- at least one edible coloring agent selected from the group consisting of an oil soluble edible dye, an oil soluble edible ink, an oil soluble edible paint, and combinations thereof containing a vegetable gum or vegetable gum derivative;
- said gelatin based substrate containing a gelatin; and
- a selected surface of said gelatin based milk substrate is painted with said at least one edible coloring agent without migration or bleeding of said at least one edible coloring agent into an area surrounding said selected surface of said gelatin milk substrate for up to 72 hours.

7. The gelatin based food product having a painted decorative surface of claim 6, including a gum selected from the group consisting of gum arabic, guar gum, locust bean gum, gelatin gum, xanthan gum, and combinations thereof.

8. An edible gelatin containing food product, comprising:
- a gelatin based milk substrate top layer comprising a gelatin based substrate mixed with a milk based product, which upon chilling sets forming a colloidal semi-solid gelatin milk substrate for painting with at least one oil based edible coloring agent without migration of said at least one oil based edible coloring agent into said colloidal semi-solid gelatin milk substrate for up to 72 hours;
- said milk based product selected from the group consisting of evaporated milk, whipping cream, heavy cream, milk, 2% milk, pudding, yogurt, cream cheese, eggnog, cottage cheese, soy milk, sour cream, skim milk, whole milk, powdered milk, condensed milk, ice cream, and combinations thereof;
- said gelatin based substrate comprising a gelatin;
- said at least one oil based edible coloring agent selected from the group consisting of an oil soluble edible dye, an oil soluble edible ink, an oil soluble edible paint, and combinations thereof containing a vegetable gum or vegetable gum derivative; and
- a second layer of a food product disposed adjacent to and below said gelatin based milk substrate top layer.

9. The edible gelatin containing food product of claim 8 including at least one additional layer of a food product.

10. The edible gelatin containing food product gelatin based product of claim 8 wherein said second layer of a food product includes a gelatin and ingredients selected from the group consisting of fruit juices, fruit, berry, nuts, vegetable pieces, carbonated soda, fruit flavored carbonated soda, sparkling club soda, fruit flavored drink, fruit flavored powder, flavorant, bean, bean extract, nut extract, and combinations thereof.

11. The edible gelatin containing food product of claim 8 said gelatin based milk substrate top layer including at least one edible coloring agent serving as a painted base coat for painting with at least one edible coloring agent.

12. The edible gelatin containing food product of claim 11 wherein said painted base coat is painted with another of said at least one edible coloring agent of a different color.

13. The edible gelatin containing food product of claim 8, further including a gum selected from the group consisting of gum arabic, guar gum, locust bean gum, gelatin gum, xanthan gum, and combinations thereof.

14. A sugar free painted gelatin food product, comprising:
- a top layer consisting of a gelatin based substrate mixed with a milk based product forming a gelatin based milk substrate, which upon which upon chilling sets forming a colloidal semi-solid gelatin milk substrate;
- said milk based product comprises evaporated milk, whipping cream, heavy cream, milk, pudding, yogurt, cream cheese, eggnog, cottage cheese, sour cream, skim milk, soy milk, whole milk, 2% milk, powdered milk, condensed milk, ice cream, and combinations thereof;
- at least one edible coloring agent selected from the group consisting of an oil soluble edible dye, an oil soluble edible ink, an oil soluble edible paint, and combinations thereof containing a vegetable gum or vegetable gum derivative;
- at least one additional layer of a food product disposed below said first top layer,
- said gelatin based substrate containing a gelatin; and
- a selected surface of said gelatin milk substrate is painted with said at least one edible coloring agent without migration or bleeding of said edible coloring agent into an area surrounding said selected surface of said gelatin milk substrate for up to 72 hours.

15. The sugar free painted gelatin food product of claim 14 including at least one additional layer comprising a selected second gelatin and ingredients selected from the group consisting of a different flavor, fruit juices, fruit, berry, nuts, vegetable pieces, carbonated soda, fruit flavored carbonated soda, sparkling club soda, fruit flavored drink, fruit flavored powder, flavorant, bean, bean extract, nut extract, and combinations thereof.

16. The sugar free painted gelatin food product of claim 14 wherein said gelatin milk substrate is painted with at least two of said at least one edible coloring agents.

17. The sugar free painted gelatin food product of claim 14, wherein said vegetable gum or said vegetable gum derivative is selected from the group consisting of gum arabic, guar gum, locust bean gum, gelatin gum, xanthan gum, and combinations thereof.

* * * * *